United States Patent
Yang et al.

(10) Patent No.: US 9,269,960 B2
(45) Date of Patent: Feb. 23, 2016

(54) ELECTRODE LEAD AND SECONDARY BATTERY HAVING THE SAME

(71) Applicant: LG CHEM, LTD., Seoul (KR)

(72) Inventors: Jung-Hoon Yang, Daejeon (KR); Seung-Don Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 13/958,947

(22) Filed: Aug. 5, 2013

(65) Prior Publication Data

US 2013/0323577 A1    Dec. 5, 2013

Related U.S. Application Data

(63) Continuation of application No. PCT/KR2013/003741, filed on Apr. 30, 2013.

(30) Foreign Application Priority Data

May 8, 2012    (KR) .................. 10-2012-0048661
Apr. 30, 2013    (KR) .................. 10-2013-0048039

(51) Int. Cl.

| | |
|---|---|
| *H01M 4/70* | (2006.01) |
| *H01M 2/30* | (2006.01) |
| *H01M 2/02* | (2006.01) |
| *H01M 2/34* | (2006.01) |
| *H01M 10/052* | (2010.01) |
| *H01M 10/42* | (2006.01) |

(52) U.S. Cl.
CPC ................ *H01M 4/70* (2013.01); *H01M 2/021* (2013.01); *H01M 2/30* (2013.01); *H01M 2/348* (2013.01); *H01M 10/052* (2013.01); *H01M 10/4235* (2013.01); *H01M 2200/103* (2013.01); *H01M 2220/30* (2013.01)

(58) Field of Classification Search
None
See application file for complete search history.

(56) References Cited

U.S. PATENT DOCUMENTS

| | | | |
|---|---|---|---|
| 2002/0113685 A1 | 8/2002 | Izaki et al. | |
| 2002/0150815 A1 | 10/2002 | Ehara | |
| 2003/0193317 A1* | 10/2003 | Shimamura et al. | 320/116 |
| 2003/0206093 A1 | 11/2003 | Hamada | |
| 2005/0030148 A1* | 2/2005 | Kono et al. | 337/159 |
| 2009/0208835 A1 | 8/2009 | Horiuchi et al. | |

FOREIGN PATENT DOCUMENTS

| | | |
|---|---|---|
| CN | 101510594 A | 8/2009 |
| DE | 101 35 256 A1 | 2/2002 |

(Continued)

*Primary Examiner* — Patrick Ryan
*Assistant Examiner* — Haixia Zhang
(74) *Attorney, Agent, or Firm* — Birch, Stewart, Kolasch & Birch, LLP

(57) ABSTRACT

An electrode lead is applied as a part of at least one of a cathode lead and an anode lead of a secondary battery and includes a first metal plate and a second metal plate spaced apart from each other with a gap therebetween and having coating layers formed on the surfaces thereof except for surfaces of end portions thereof facing each others, and a metal bridge made of material having a lower melting point than the first metal plate and the second metal plate and buried in the gap so that the end portions are not exposed. In this case, if an overcurrent flows through the electrode lead, a portion of the metal plate at which a metal bridge is formed is rapidly broken to irreversibly interrupt the overcurrent flowing at the secondary battery without giving a substantial influence on the temperature of the secondary battery.

18 Claims, 6 Drawing Sheets

(56) References Cited

FOREIGN PATENT DOCUMENTS

| DE | 603 12 764 T2 | 12/2007 |
| JP | 11-67190 A | 3/1999 |
| JP | 2004-106059 A | 4/2004 |
| JP | 2008-177084 A | 7/2008 |
| TW | 543217 B | 7/2003 |
| WO | WO 2006/090511 A1 | 8/2006 |

* cited by examiner

ELECTRODE LEAD AND SECONDARY BATTERY HAVING THE SAME

CROSS-REFERENCE TO RELATED APPLICATION

The present application is a continuation of International Application No. PCT/KR2013/003741 filed on Apr. 30, 2013, which claims priority to Korean Patent Application No. 10-2012-0048661 filed on May 8, 2013, and Korean Patent Application No. 10-2013-0048039 filed on Apr. 30, 2013, in the Republic of Korea, the disclosures of which are incorporated herein by reference.

TECHNICAL FIELD

The present disclosure relates to a secondary battery technology, and more particularly, to an electrode lead capable of improving safety of a secondary battery and a secondary battery manufactured using the electrode lead.

BACKGROUND ART

As portable electric products such as video cameras, portable phones and portable PC are more actively used, the importance of a secondary battery generally used as a driving source of such a portable electric product is increasing.

Different from a primary battery which may not be charged, a secondary battery allows charging and discharging and is actively studied in high-tech industries such as digital cameras, cellular phones, laptop computers, power tools, electric bicycles, electric vehicles, hybrid vehicles, mass-capacity power storage device or the like.

In particular, the use of a lithium secondary battery is gaining since it has a high energy density per unit weight and allows rapid charging in comparison to other existing secondary batteries such as lead storage batteries, nickel-cadmium batteries, nickel-hydrogen batteries, nickel-zinc batteries or the like.

The lithium secondary battery has an operating voltage of 3.6V or above and is used as a power source of a portable electronic device. In other cases, a plurality of batteries are connected in series and/or in parallel and used for high-power electric vehicles, hybrid vehicles, power tools, electric bicycles, power storage devices, UPS or the like.

The lithium secondary battery has a triple operating voltage in comparison to nickel-cadmium batteries or nickel-metal hydride batteries and is used more and more due to its high energy density per unit weight.

Depending on the kind of electrolyte, a lithium secondary battery may be classified into a lithium ion battery using a liquid electrolyte and a lithium ion polymer battery using a solid electrolyte. In addition, depending on the kind of polymer solid electrolyte, the lithium ion polymer battery may be classified into an all solid lithium ion polymer battery containing no electrolyte and a lithium ion polymer battery using a gel-type polymer electrolyte containing an electrolyte.

Lithium ion batteries using a liquid electrolyte mostly use a cylindrical or rectangular metal can as a container and are sealed therein by welding. A can type secondary battery using such a metal can as a container has a fixed shape and thus limits the design of an electric product which uses the battery as a power source. In addition, it is difficult to decrease the volume of the product. Therefore, a pouch type secondary battery prepared by putting an electrode assembly and an electrolyte into a pouch package made of a film and then sealing the same has been developed and used.

However, the lithium secondary battery may explode when being overheated, and so issues of ensuring safety is of major concern. The lithium secondary battery may be overheated due to various factors, of which an example is a case in which an overcurrent exceeding a limit flows through the lithium secondary battery. If an overcurrent flows, the lithium secondary battery generates Joule's heat and thus an internal temperature of the battery rapidly increases. In addition, the rapid increase of temperature causes a decomposition reaction of the electrolyte and thermal runaway, which may lead to explosion of the battery. An overcurrent may occur when a sharp metallic matter pierces the lithium secondary battery, when an insulation between a cathode and an anode breaks due to the shrinkage of a separator interposed between the cathode and the anode, when a rush current is applied to the battery due to an abnormal charging circuit or a load connected to the outside, or the like.

Therefore, the lithium secondary battery is coupled to a protection circuit in order to protect the battery against abnormal states such as the occurrence of an overcurrent. The protection circuit generally includes a fuse element which irreversibly disconnects a line where a charging or discharging current flows when an overcurrent occurs.

FIG. 1 is a circuit diagram for illustrating an arrangement and an operating mechanism of a fuse element employed in a protection circuit coupled to a battery module which includes a lithium secondary battery.

As shown in FIG. 1, a protection circuit includes a fuse element 1 for protecting a battery module when an overcurrent occurs, a sense resistor 2 for sensing an overcurrent, a microcontroller 3 for monitoring an occurrence of an overcurrent and operating the fuse element 1 when an overcurrent occurs, and a switch 4 for switching the flow of an operating current to the fuse element 1.

The fuse element 1 is installed to a main line connected to the outermost terminal of the battery module. The main line represents a wire through which a charging current or a discharging current flows. In FIG. 1, it is depicted that the fuse element 1 is installed at a high potential line (Pack+).

The fuse element 1 is a three-terminal element, in which two terminals are connected to the main line through which a charging or discharging current flows and one terminal is connected to the switch 4. In addition, the fuse element includes a fuse 1a connected to the main line in series and disconnected at a specific temperature and a resistor 1b for applying heat to the fuse 1a.

The microcontroller 3 monitors the occurrence of an overcurrent by periodically detecting voltages at both ends of the sense resistor 2, and turns on the switch 4 if it is determined that an overcurrent occurs. In this case, the current flowing through the main line flows to the fuse element 1 by bypassing and is applied to the resistor 1b. Accordingly, the Joule's heat generated at the resistor 1b is conducted to the fuse 1a to raise the temperature of the fuse 1a. If the temperature of the fuse 1a increases to a melting temperature, the fuse 1a is fused to irreversibly cut the main line. If the main line is cut, the overcurrent does not flow any more, which solves problems caused from the overcurrent.

However, the above techniques have several problems. For example, if the microcontroller 3 malfunctions, even though an overcurrent occurs, the switch 4 does not turn on. In this case, a current is not applied to the resistor 1b of the fuse element 1, and therefore the fuse element 1 does not operate. In addition, a space for disposing the fuse element 1 should be separately provided in the protection circuit, and a program algorithm for controlling operations of the fuse element 1 should be loaded on the microcontroller 3. Therefore, the spatial efficiency of the protection circuit deteriorates, and the load of the microcontroller 3 increases.

DISCLOSURE

Technical Problem

The present disclosure is designed to solve the problems of the related art, and therefore the present disclosure is directed to providing an electrode lead which allows a secondary battery to have an overcurrent interrupting function in a manual manner, separately from an active overcurrent interrupting function of a protection circuit.

The present disclosure is also directed to providing a secondary battery, which is manufactured using the electrode lead.

Other objects and advantages of the present disclosure will be understood from the following description and become more apparent by embodiments of the present disclosure. In addition, it could be easily understood that the objects and advantages of the present disclosure can be implemented by means and their combinations defined in the claims.

Technical Solution

In one aspect of the present disclosure, there is provided an electrode lead, which is applied as a part of at least one of a cathode lead and an anode lead of a secondary battery, the electrode lead including a first metal plate and a second metal plate spaced apart from each other with a gap therebetween and having coating layers formed on the surfaces thereof except for surfaces of end portions thereof facing each others; and a metal bridge made of material having a lower melting point than the first metal plate and the second metal plate and buried in the gap so that the end portions are not exposed.

According to an embodiment of the present disclosure, the surface of the end portion may include a first surface positioned inside the gap.

According to another embodiment of the present disclosure, the surface of the end portion may include a second surface extending from the first surface and positioned out of the gap.

According to another embodiment of the present disclosure, the first metal plate and the second metal plate may be located in parallel on the same plane.

According to another embodiment of the present disclosure, the first metal plate and the second metal plate may be made of aluminum (Al) or copper (Cu).

According to another embodiment of the present disclosure, the coating layer may be made of nickel (Ni).

In the present disclosure, the metal bridge may be a lead-free alloy containing tin (Sn) and copper (Cu) as main components.

In the present disclosure, wherein the content of the tin may be 80 to 98 wt %, and the content of the copper may be 2 to 20 wt %. In addition, the metal bridge may further include at least one additional metal selected from the group consisting of nickel (Ni), zinc (Zn) and silver (Ag).

In the present disclosure, the content of the additional metal may be 0.01 to 10 wt %.

Preferably, the metal bridge may have a melting point of 150 to 300° C.

Preferably, the gap may be 25 to 45 vim.

Selectively, the first metal plate and the second metal plate may be made of copper, and the electrode lead may be the anode lead.

In the present disclosure, the surfaces of the first metal plate and the second metal plate, which face each other, may be inclined to be tapered in opposite directions.

As an alternative, the surfaces of the first metal plate and the second metal plate, which face each other, may protrude convexly toward the metal bridge.

In another aspect, there is also provided a secondary battery manufactured using the electrode lead according to the present disclosure.

The secondary battery according to the present disclosure includes an electrode assembly having a cathode tab and an anode tab; and a cathode lead and an anode lead respectively coupled to the cathode tab and the anode tab, wherein the electrode lead according to the present disclosure is applied as at least one of the cathode lead and the anode lead.

In the present disclosure, the first metal plate and the second metal plate may be made of copper, and the coating layer may be made of nickel.

In the present disclosure, the electrode lead may be the anode lead.

According to an embodiment of the present disclosure, the secondary battery may further include a case for accommodating the electrode assembly so that the cathode lead and the anode lead are not exposed outwards.

According to another embodiment of the present disclosure, the secondary battery may further include an insulative tape attached to the electrode lead.

According to another embodiment of the present disclosure, the secondary battery may further include an electrolyte filled in the case.

In another aspect of the present disclosure, there is also provided a part for a secondary battery, which is applied to at least one of a bus bar of a secondary battery module, a connecting bar connecting a plurality of secondary battery modules, and a connecting bar connecting a plurality of secondary battery packs, the part including a first metal plate and a second metal plate spaced apart from each other with a gap therebetween and having coating layers formed on the surfaces thereof except for surfaces of end portions thereof facing each others; and a metal bridge made of material having a lower melting point than the first metal plate and the second metal plate and buried in the gap so that the end portions are not exposed.

Advantageous Effects

According to an aspect of the present disclosure, if an overcurrent flows through the electrode lead, a portion of the metal plate at which a metal bridge is formed is broken to irreversibly interrupt the overcurrent flowing at the secondary battery.

According to another aspect of the present disclosure, since the area occupied by the metal bridge in the metal plate is small, the increase of resistance caused by the presence of the metal bridge is negligible, and the overall size and shape of the product are substantially not changed.

According to another aspect of the present disclosure, tensile strength is improved due to excellent mechanical properties of the metal bridge and a great contact area between the metal plate and the metal bridge.

According to another aspect of the present disclosure, since the metal plate makes direct contact with the metal bridge, the loss of electric conductivity may be minimized, and the coupling force between the metal plate and the metal bridge may be enhanced.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings in which.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
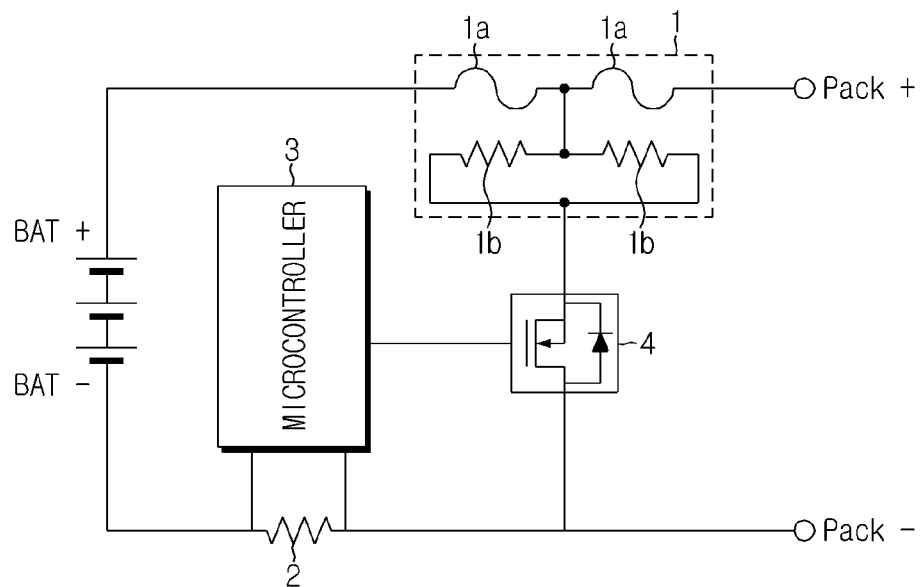
FIG. 1 is a circuit diagram for illustrating an arrangement and an operating mechanism of a fuse element employed in a protection circuit coupled to a battery module.
Figure 2:
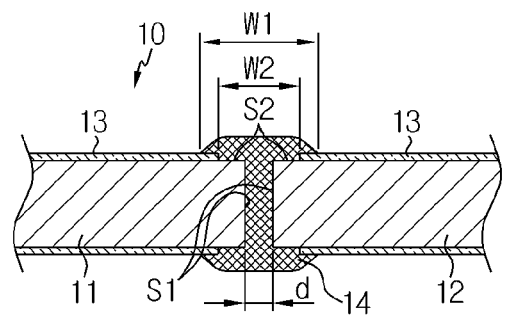
FIG. 2 is a partial cross-sectional view showing an electrode lead according to the present disclosure.
Figure 3:
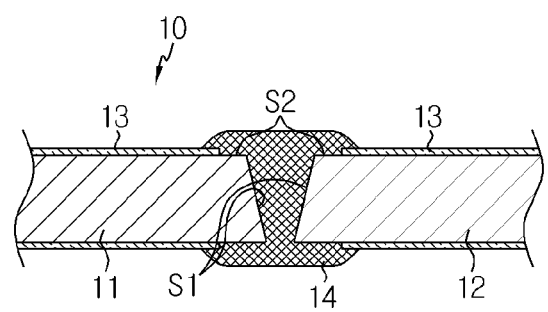
FIGS. 3 and 4 are partial cross-sectional views showing modifications of the electrode lead of FIG. 2.
Figure 4:
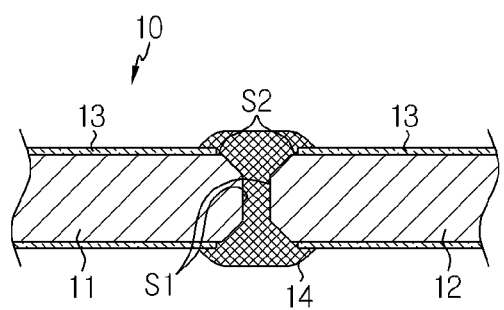

Referring to FIGS. 2 to 4, an electrode lead 10 according to an embodiment of the present disclosure will be described in detail.

FIG. 2 is a partial cross-sectional view showing an electrode lead according to the present disclosure, and FIGS. 3 and 4 are partial cross-sectional views showing modifications of the electrode lead of FIG. 2.

Referring to FIG. 2, the electrode lead 10 includes a first metal plate 11, a second metal plate 12, a coating layer 13 and a metal bridge 14.

The first metal plate 11 and the second metal plate 12 are made of thin metal plates and located in parallel on the same plane with a gap being interposed between them. The metal plates 11, 12 are generally made of aluminum (Al) or copper (Cu), but the material of the metal plates 11, 12 is not limited thereto in the present disclosure. The material of the metal plates 11, 12 may be changed according to whether the electrode lead 10 is applied to a cathode lead or an anode lead of a secondary battery. In other words, if the electrode lead 10 is used as a cathode lead, the electrode lead 10 may be made of aluminum, and if the electrode lead 10 is used as an anode lead, the electrode lead 10 may be made of copper.

The width of the gap has a direct relation with the increase or decrease of a current path through the metal bridge 14. If the width d increases, this may cause the increase of resistance of the electrode lead 10. Therefore, the gap preferably has as small width d as possible. Meanwhile, if the gap has an excessively small width d, even though the metal bridge 14 is melted, the current flow between the first metal plate 11 and the second metal plate 12 may not be interrupted. In this consideration, the gap between the metal plates 11, 12 has a width d of about 1 to 100 μm, preferably about 25 to 45 μm.

The coating layer 13 is formed on the surface of each metal plate 11, 12 to protect the metal plates 11, 12 so that the surface thereof is not exposed outwards, and the coating layer 13 may be made of nickel (Ni) for example. When the electrode lead 10 is applied to a secondary battery, the coating layer 13 prevents the metal plates 11, 12 from directly contacting the electrolyte, prevents the surfaces of the metal plates 11, 12 from being oxidized, and improves tensile strength of the electrode lead 10. In particular, in the case the electrode lead 10 is made of copper, the coating layer 13 facilitates easier adhesion between the electrode lead 10 and an insulative tape attached to the electrode lead 10. The insulative tape will be described later in more detail with reference to FIG. 5. The coating layer 13 may be made of any material which may satisfy the above function.

The coating layer 13 is formed on the surfaces of the metal plates 11, 12 except for surfaces of end portions thereof facing each other. Here, the end portions facing each other may mean only a first surface S1 positioned inside the gap or mean both the first surface S1 and a second surface S2 extending from the first surface S1 and positioned out of the gap.

In particular, if the surfaces of the end portions facing each other includes both the first surface S1 and the second surface S2, the metal bridge 14 is directly joined to the metal plates 11, 12 through a region at which the coating layer 13 is not formed, thereby improving electric conductivity and a junction.

Moreover, in this case, since the metal bridge 14 and the coating layer 13 are formed not to overlap each other, it is possible to prevent the joining portions of the metal plates 11, 12 from being brittle.

In other words, if the metal bridge 14 and the coating layer 13 are formed to overlap each other, nickel (Ni) particles of the coating layer 13 penetrate between tin (Sn) particles of the metal bridge 14, which makes the metal bridge 14 brittle. However, the electrode lead 10 of the present disclosure is configured to prevent such a phenomenon.

The metal bridge 14 is buried in the gap between the metal plates 11, 12 to serve as an electric passage between the first metal plate 11 and the second metal plate 12. The metal bridge 14 is attached to at least portions of the surfaces of the metal plates 11, 12 which are exposed out of the coating layer 13, thereby preventing the metal plates 11, 12 from being exposed outwards.

The metal bridge 14 may be buried in the gap by means of a soldering process. In other words, at a region of one side of the metal plates 11, 12 which is adjacent to the gap, the soldering process is performed using a solder alloy material which may form the metal bridge 14. By doing so, the solder alloy material is melted and flows into the gap by means of a capillary phenomenon, thereby forming the metal bridge 14 in the gap. After that, the same process is performed at the other side of the metal plates 11, 12 so that the metal bridge 14 is joined to end portions of the metal plates 11, 12 which face each other.

The metal bridge 14 has a melting point of about 150 to 300° C., which is lower than the melting point of the metal plates 11, 12, and is made of a lead-free alloy containing tin (Sn) and copper (Cu) as main components and not containing lead (Pb) which is harmful to the human body.

The melting point range of the metal bridge 14 is set in consideration of an overcurrent level to be interrupted. If the melting point of the metal bridge 14 is lower than 150° C., even though a normal current flows at the electrode lead 10, the metal bridge 14 may be melted. For example, in the case the electrode lead 10 is used for a secondary battery of an electric vehicle, if the melting point is lower than 150° C., the metal bridge 14 may be melted due to rapid charging/discharging current. In addition, if the melting point of the electrode lead 10 is higher than 300° C., an overcurrent may not be effectively interrupted, and therefore it is ineffective to use the electrode lead 10 having the metal bridge 14.

Among components of the metal bridge 14, tin gives an influence on the melting point and tensile strength of the metal bridge 14. The content of tin is adjusted to be about 80 wt % or above, preferably in the range of about 85 to 98 wt % so that the metal bridge 14 has a melting point of about 150 to 300° C. and good tensile strength. The copper improves electric conductivity of the electrode lead 10. If putting this function into consideration, the content of copper is adjusted in the range of about 2 to 20 wt %, preferably in the range of about 4 to 15 wt %. Here, wt % is a unit based on the weight of all materials of the metal bridge 14, throughout this specification.

If the contents of tin and copper are adjusted to be in suitable ranges as described above, the metal bridge 14 may have good tensile strength, and the increase of resistance between the metal bridge 14 and the electrode lead 10 may be controlled low below several %.

The metal bridge 14 may further include a metal with good electric conductivity such as nickel (Ni), silver (Ag), zinc (Zn) or the like as an additional alloy component in addition to tin and copper in order to have improved properties. The content of the additional alloy component is preferably about 0.01 to 10 wt % in comparison to the entire weight of the metal bridge 14.

As described above, the electrode lead 10 according to the present disclosure is configured so that the surfaces of the metal plates 11, 12, particularly a region of the surfaces where the metal bridge 14 is formed, are not exposed outwards and the coating layer 13 is not formed at end portions of the metal plates 11, 12 which face each other. Therefore, the electrode lead 10 according to the present disclosure prevents the metal plates 11, 12 from contacting the electrolyte and causing side reactions and maintains high tensile strength while keeping a low electric resistance at a connection portion of the metal plates 11, 12.

Referring to FIGS. 3 and 4, the end portions of the metal plates 11, 12 which face each other may have various shapes, and accordingly the metal bridge 14 may also have various shapes.

The structure depicted in FIG. 3 is different from the structure of FIG. 2 in the point that the first surfaces S1 of the metal plates 11, 12 have inclined surfaces tapered in opposite directions. The structure depicted in FIG. 4 is different from the structure of FIG. 2 in the point that the first surface S1 of each of the metal plates 11, 12 protrudes convexly toward the metal bridge 14.

In comparison to the structure of FIG. 2, the structures depicted in FIGS. 3 and 4 has an enlarged contact area between the metal bridge 14 and the metal plates 11, 12, which reinforces the coupling force between the metal plates 11, 12 and the metal bridge 14 and reduces a contact resistance.

In the present disclosure, even though the shapes of the end portions of the metal plates 11, 12 which face each other have been described based on the structures depicted in FIGS. 2 to 4, the present disclosure is not limited thereto. In other words, the end portion may have various shapes, and for example the first surfaces S1 may be inclined to be tapered in the same direction and the metal plates 11, 12 may also be concaved inwards or have hills and valleys repeatedly.

Next, the secondary battery 20 according to the present disclosure manufactured using the above electrode lead will be described with reference to FIG. 5.

Figure 5:
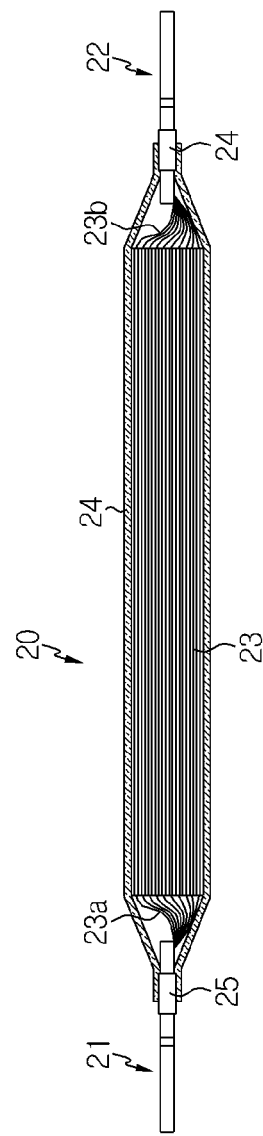
FIG. 5 is a cross-sectional view showing a secondary battery according to the present disclosure, which is manufactured using the electrode lead of FIG. 2.

FIG. 5 is a cross-sectional view showing a secondary battery according to the present disclosure, which is manufactured using the electrode lead of FIG. 2.

Referring to FIG. 5, the secondary battery 20 according to the present disclosure includes a cathode lead 21, an anode lead 22, an electrode assembly 23, a case 24 and an insulative tape 25.

The cathode lead 21 and the anode lead 22 have substantially the same structure as the electrode lead 10 according to the present disclosure. In other words, the cathode lead 21 and the anode lead 22 are configured so that two metal plates are connected by a metal bridge.

Meanwhile, different from the figures, the electrode lead 10 according to the present disclosure may be applied to any one of the cathode lead 21 and the anode lead 22.

If the electrode lead 10 of the present disclosure is applied to only one of the cathode lead 21 and the anode lead 22, it will be more effective that the electrode lead 10 is applied to the anode lead 22. This is because the caloric value at a cathode of the secondary battery 20 is generally greater than the caloric value at an anode.

The electrode assembly 23 includes at least one unit cell which is configured so that a separator is interposed between a cathode and an anode, and an insulating film for intercepting an electric connection between unit cells are interposed between unit cells adjacent to each other. The cathode is configured so that at least one surface the cathode current collector is coated with cathode active material, the anode is configured so that at least one surface of the anode current collector is coated with anode active material.

The electrode assembly 23 includes a plurality of cathode tabs 23a and anode tabs 23b respectively extending from the cathode and the anode. The plurality of cathode tabs 23a and anode tabs 23b are collected in mass by means of primary welding and then respectively joined to the cathode lead 21 and the anode lead 22 by means of secondary welding.

Meanwhile, different from the figures, the cathode tabs 23a and the anode tabs 23b may extend in the same direction from the electrode assembly 23, and accordingly the cathode lead 21 and the anode lead 22 may also extend in the same direction.

The case 24 is made of an aluminum pouch film whose inner surface opposite to the outer surface of the electrode assembly 23 has a thermal bonding layer. The case 24 is sealed by thermally bonding its edges while accommodating the electrode assembly 23 therein. The sealed case 24 is filled with a liquid, solid or gel electrolyte depending on the kind of the secondary battery 20.

The insulative tape 25 is attached to the electrode leads 21, 22 and interposed between the electrode leads 21, 22 and the case 24. The insulative tape 25 prevents a short circuit from occurring between the electrode leads 21, 22 and the metal layer of the case 24 and improves a bonding force between the electrode leads 21, 22 and the case 24.

Since the secondary battery 20 according to the present disclosure adopts the electrode lead 10 having a breaking structure according to the present disclosure as the cathode lead 21 and/or the anode lead 22 as described above, it is possible to effectively interrupt an overcurrent caused by a short circuit while maintaining the performance of the secondary battery.

The excellent performance of the electrode lead 10 and the secondary battery 20 is shown in the graphs of FIGS. 6 to 9, which represent experimental results.

Figure 6:
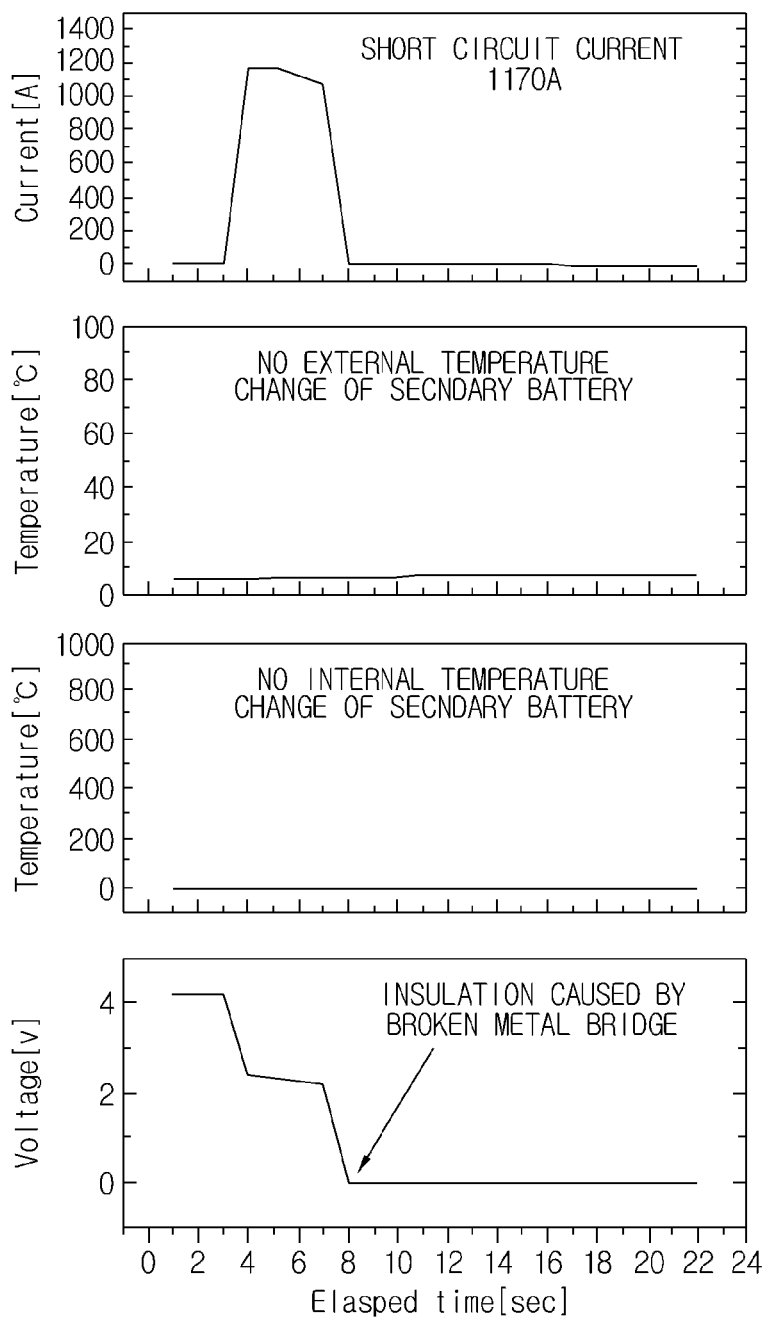
FIG. 6 is a graph showing an external short circuit experiment result for a secondary battery to which the electrode lead according to the present disclosure is applied.
Figure 7:
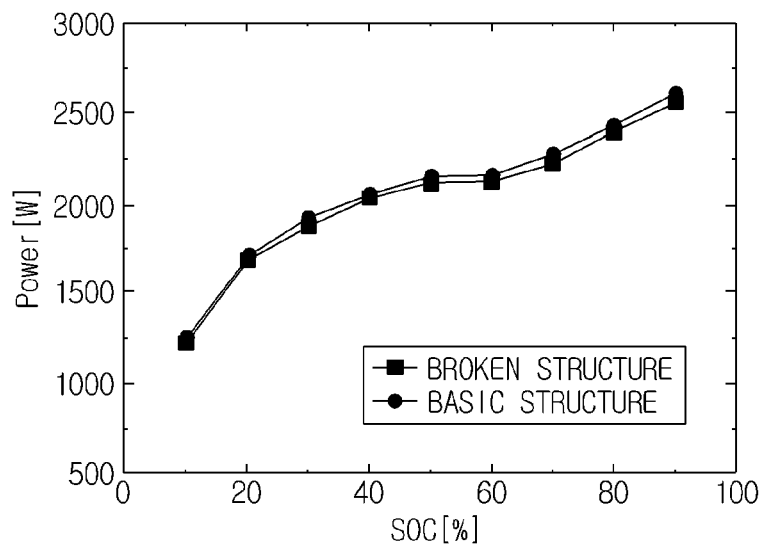
FIG. 7 is a graph showing an output characteristic experiment result for a secondary battery to which the electrode lead according to the present disclosure is applied.
Figure 8:
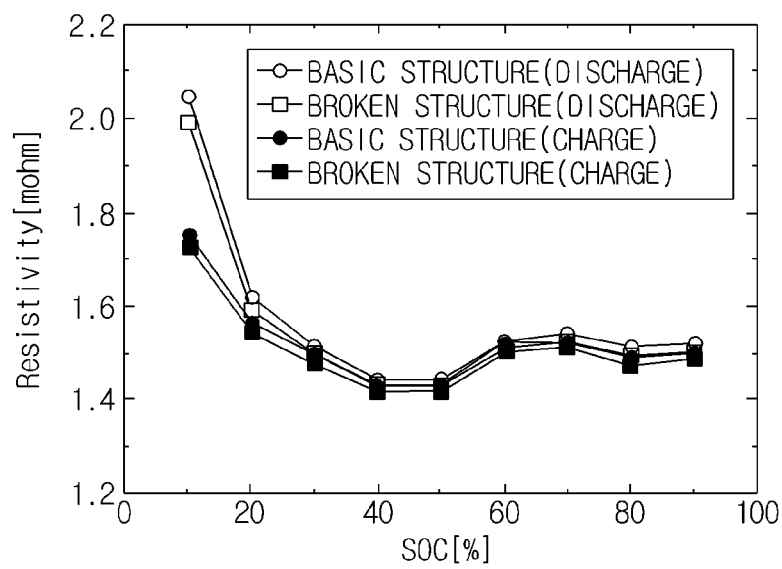
FIG. 8 is a graph showing a resistance characteristic experiment result for a secondary battery to which the electrode lead according to the present disclosure is applied.
Figure 9:
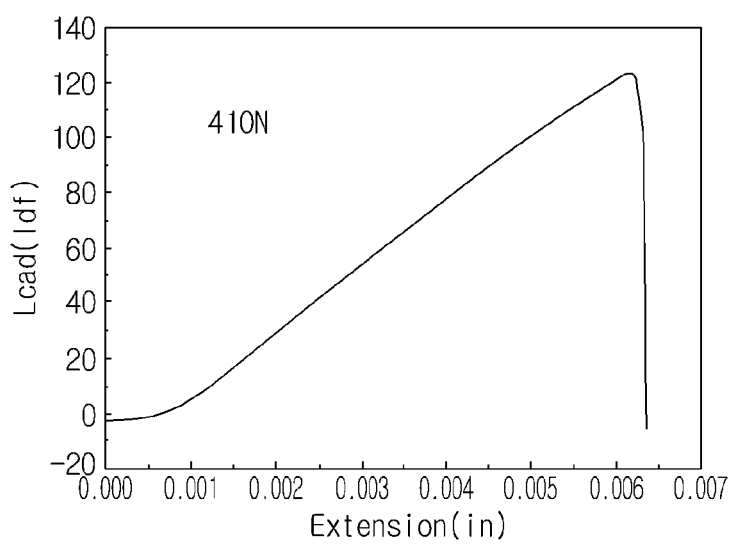
FIG. 9 is a graph showing a tensile strength experiment result for a secondary battery to which the electrode lead according to the present disclosure is applied.

FIGS. 6 to 8 are graphs showing an external short circuit experiment result, an outer characteristic experiment result and a resistance characteristic experiment result for a secondary battery to which the electrode lead according to the present disclosure is applied as an anode lead, and FIG. 9 is a graph showing a tensile strength experiment result for the electrode lead according to the present disclosure.

The electrode lead 10 depicted in FIG. 2 was used as the anode lead 22 applied to the secondary battery 20 according to the embodiment. In detail, the electrode lead 10 includes copper plates 11, 12 having the nickel coating layers 13 and having a thickness of 0.3 mm and the metal bridge 14 containing 89 wt % of tin, 10 wt % of copper and 1 wt % of nickel. In addition the gap has a width d of 35 μm, the metal bridge has a maximum width W1 of 6 μm, and the distance W2 between the ends of the coating layers 13 is 4.5 μm.

Meanwhile, the anode lead applied to a secondary battery of a comparative example is substantially identical to the electrode lead 10 applied to the secondary battery according to the example, except that the metal bridge 14 is not used and the nickel coating layer is formed on the entire surface of the copper plate.

Referring to the external short circuit experiment result shown in FIG. 6, when an overcurrent (1170 A) flows, in a state in which the temperature of the secondary battery 20 does not substantially increase, the electrode lead 10 is surely broken within several seconds, which prevents the secondary battery 20 from being overheated. Moreover, referring to the output and resistance characteristic experiment results shown in FIGS. 7 and 8, the output and resistance values of the secondary battery 20 of the example according to state of charge (SOC) were different within 2% which is an error range of general cells, in comparison to the secondary battery of the comparative example. These results are because the surfaces of the metal plates 11, 12 are not exposed outwards and the coating layer 13 is not formed at the end portions of the metal plates 11, 12 which face each other.

Referring to the tensile strength experiment result shown in FIG. 9, the electrode lead 10 was gradually elongated as the tensile force applied thereto increases, and the electrode lead 10 was broken when a tensile force of about 120 lbf is applied. This value is greater in comparison to general anode leads, and this is caused by excellent mechanical properties of the tin-copper alloy used for the metal bridge 14 and the great contact area between the copper plates 11, 12 and the metal bridge 14.

Meanwhile, though not shown in the figures, the electrode lead 10 according to the present disclosure may be applied to various parts for electric connection of the secondary battery, without being limited to the electrode lead 10. In other words, the electrode lead 10 may be applied to a bus bar which connects a battery cell of a secondary battery module to an external terminal, a connecting bar which connects a plurality of secondary battery modules, a connecting bar which connects a plurality of secondary battery packs, or the like.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. An electrode lead, which is applied as a part of at least one of a cathode lead and an anode lead of a secondary battery, the electrode lead comprising:
    a first metal plate and a second metal plate spaced apart from each other with a gap therebetween and having coating layers formed on surfaces thereof except for surfaces of end portions thereof facing each other; and
    a metal bridge made of material having a lower melting point than the first metal plate and the second metal plate and buried in the gap so that the end portions are not exposed,
    wherein the surface of the end portion includes a first surface positioned inside the gap and a second surface extending from the first surface and positioned out of the gap,
    wherein the coating layer is made of nickel,
    wherein the metal bridge is a lead-free alloy containing tin and copper as main components, and
    wherein the metal bridge and the coating layer are formed not to overlap each other.

2. The electrode lead according to claim 1, wherein the first metal plate and the second metal plate are located in parallel on the same plane.

3. The electrode lead according to claim 1, wherein the first metal plate and the second metal plate are made of aluminum or copper.

4. The electrode lead according to claim 1, wherein the content of the tin is 80 to 98 wt%, and
    wherein the content of the copper is 2 to 20 wt%.

5. The electrode lead according to claim 4, wherein the metal bridge further includes at least one additional metal selected from the group consisting of nickel, zinc and silver.

6. The electrode lead according to claim 5, wherein the content of the additional metal is 0.01 to 10 wt%.

7. The electrode lead according to claim 1, wherein the metal bridge has a melting point of 150 to 300° C.

8. The electrode lead according to claim 1, wherein the gap is 25 to 45 μm.

9. The electrode lead according to claim 1, wherein the first metal plate and the second metal plate are made of copper, and
    wherein the electrode lead is the anode lead.

10. The electrode lead according to claim 1, wherein the surfaces of the first metal plate and the second metal plate, which face each other, are inclined to be tapered in opposite directions.

11. The electrode lead according to claim 1, wherein the surfaces of the first metal plate and the second metal plate, which face each other, protrude convexly toward the metal bridge.

12. The electrode lead of claim 1, wherein the metal bridge directly contacts the top surface of the first metal plate and second metal plate.

13. A secondary battery, comprising:
    an electrode assembly having a cathode tab and an anode tab; and
    a cathode lead and an anode lead respectively coupled to the cathode tab and the anode tab,
    wherein the electrode lead defined in the claim 1 is applied as at least one of the cathode lead and the anode lead.

14. The secondary battery according to claim 13, wherein the first metal plate and the second metal plate are made of copper, and
    wherein the coating layer is made of nickel.

15. The secondary battery according to claim 13, wherein the electrode lead is the anode lead.

16. The secondary battery according to claim 13, further comprising a case for accommodating the electrode assembly so that the cathode lead and the anode lead are not exposed outwards.

17. The secondary battery according to claim 13, further comprising an insulative tape attached to the electrode lead.

18. The secondary battery according to claim 16, further comprising an electrolyte filled in the case.

* * * * *